(12) United States Patent
Sutton et al.

(10) Patent No.: US 11,036,289 B2
(45) Date of Patent: Jun. 15, 2021

(54) SYSTEMS AND METHODS TO PRESENT INFORMATION IN A VIRTUAL ENVIRONMENT

(71) Applicant: Facebook, Inc., Menlo Park, CA (US)

(72) Inventors: Charles Matthew Sutton, San Francisco, CA (US); Cliff Warren, San Francisco, CA (US); Gabriel Valdivia, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 144 days.

(21) Appl. No.: 15/396,426

(22) Filed: Dec. 31, 2016

(65) Prior Publication Data
US 2018/0189254 A1 Jul. 5, 2018

(51) Int. Cl.
*G06F 3/01* (2006.01)
*G06F 3/0485* (2013.01)

(52) U.S. Cl.
CPC ............. *G06F 3/013* (2013.01); *G06F 3/017* (2013.01); *G06F 3/0485* (2013.01)

(58) Field of Classification Search
CPC ....... G06F 17/241; G06F 3/013; G06F 3/0485
See application file for complete search history.

(56) References Cited

U.S. PATENT DOCUMENTS

| 2006/0256083 | A1* | 11/2006 | Rosenberg | G06F 3/013 345/156 |
|---|---|---|---|---|
| 2013/0187835 | A1* | 7/2013 | Vaught | G06F 3/013 345/8 |
| 2013/0335442 | A1* | 12/2013 | Fleck | G09G 3/003 345/629 |
| 2015/0058812 | A1* | 2/2015 | Lindh | G02B 27/00 715/863 |
| 2015/0206321 | A1* | 7/2015 | Scavezze | G06F 3/013 345/633 |
| 2015/0243061 | A1* | 8/2015 | Zhang | G09G 5/18 345/467 |
| 2017/0316186 | A1* | 11/2017 | Breitenfeld | G06F 21/6218 |
| 2018/0304107 | A1* | 10/2018 | Juran | A62B 18/082 |

* cited by examiner

*Primary Examiner* — Shen Shiau
(74) *Attorney, Agent, or Firm* — Sheppard Mullin Richter & Hampton LLP

(57) ABSTRACT

Systems, methods, and non-transitory computer readable media are configured to receive detected information relating to user interaction by a user in a digital environment directed at a concept associated with text-based content. Display of at least a portion of the text-based content to the user is caused in response to the user interaction.

20 Claims, 9 Drawing Sheets

400

Receive detected information relating to user interaction by a user in a digital environment directed at a concept associated with text-based content
402

Cause display of at least a portion of the text-based content to the user in response to the user interaction
404

```
┌─────────────────────────────────────────────────────────────────────┐
│ Maintain display of at least a portion of text-based content to a user in response │
│   to detected information indicating that a first duration of time, during which a │
│ user interaction has been directed at a concept, is less than a threshold duration │
│                                  of time                            │
│                                   502                               │
└─────────────────────────────────────────────────────────────────────┘
                                     │
                                     ▼
┌─────────────────────────────────────────────────────────────────────┐
│  Cause display to the user of a second portion of the text-based content that is │
│    more than the at least a portion of the text-based content in response to the │
│   detected information indicating that a second duration of time, during which the │
│  user interaction has been directed at the concept, is equal to or greater than the │
│                          threshold duration of time                 │
│                                   504                               │
└─────────────────────────────────────────────────────────────────────┘
                                     │
                                     ▼
┌─────────────────────────────────────────────────────────────────────┐
│   Cause display of a reduction in the second portion of the text-based content in │
│      response to the user interaction being directed away from the concept │
│                                   506                               │
└─────────────────────────────────────────────────────────────────────┘
```

FIGURE 5

SYSTEMS AND METHODS TO PRESENT INFORMATION IN A VIRTUAL ENVIRONMENT

FIELD OF THE INVENTION

The present technology relates to virtual environments. More particularly, the present technology relates to techniques for presenting textual content in virtual environments.

BACKGROUND

Users often utilize computing devices for a wide variety of purposes. Users can use their computing devices to, for example, interact with one another, access media content, share media content, and create media content. In some cases, media content can be provided by users of a social networking system. The media content can include one or a combination of, for example, text, images, videos, and audio. The media content may be published to the social networking system for consumption by others.

Under conventional approaches, media content provided through a social networking system can be accessed by users of the social networking system in various manners. In some cases, various media content can be provided to a user based on selections of the user or interests of the user as determined by the social networking system. In some instances, the social networking system can present for a user media content that is supportive of an immersive experience associated with a virtual reality environment.

SUMMARY

Various embodiments of the present technology can include systems, methods, and non-transitory computer readable media configured to receive detected information relating to user interaction by a user in a digital environment directed at a concept associated with text-based content. Display of at least a portion of the text-based content to the user is caused in response to the user interaction.

In some embodiments, the digital environment comprises at least one of a virtual reality (VR) environment, an augmented reality (AR) environment, or a mixed reality (MR) environment.

In some embodiments, the digital environment is provided through at least one of media content presented through an interface or a camera view, the media content comprising at least one of a panoramic photo, a 360 photo, a photo sphere, a 360 video, a three-dimensional (3D) simulation, or a 3D animation.

In some embodiments, the user interaction comprises a gaze gesture at the concept.

In some embodiments, the text-based content is associated with access rights determined by a content provider, the user capable of viewing the text-based content based on the access rights.

In some embodiments, the display of the at least a portion of the text-based content to the user is maintained in response to the detected information indicating that a first duration of time, during which the user interaction has been directed at the concept, is less than a threshold duration of time.

In some embodiments, display to the user of a second portion of the text-based content that is more than the at least a portion of the text-based content is caused in response to the detected information indicating that a second duration of time, during which the user interaction has been directed at the concept, is equal to or greater than the threshold duration of time.

In some embodiments, the second portion of the text-based content is initially displayed in a scrolling manner in the digital environment.

In some embodiments, display of a reduction in the second portion of the text-based content is caused in response to the user interaction being directed away from the concept.

In some embodiments, the display of the at least a portion of the text-based content to the user is provided at an angle as the user interaction is directed away from the concept.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 4 illustrates an example first method relating to presentation of text-based content, according to an embodiment of the present technology.

FIG. 5 illustrates an example second method relating to presentation of text-based content, according to an embodiment of the present technology.

Figure 1:
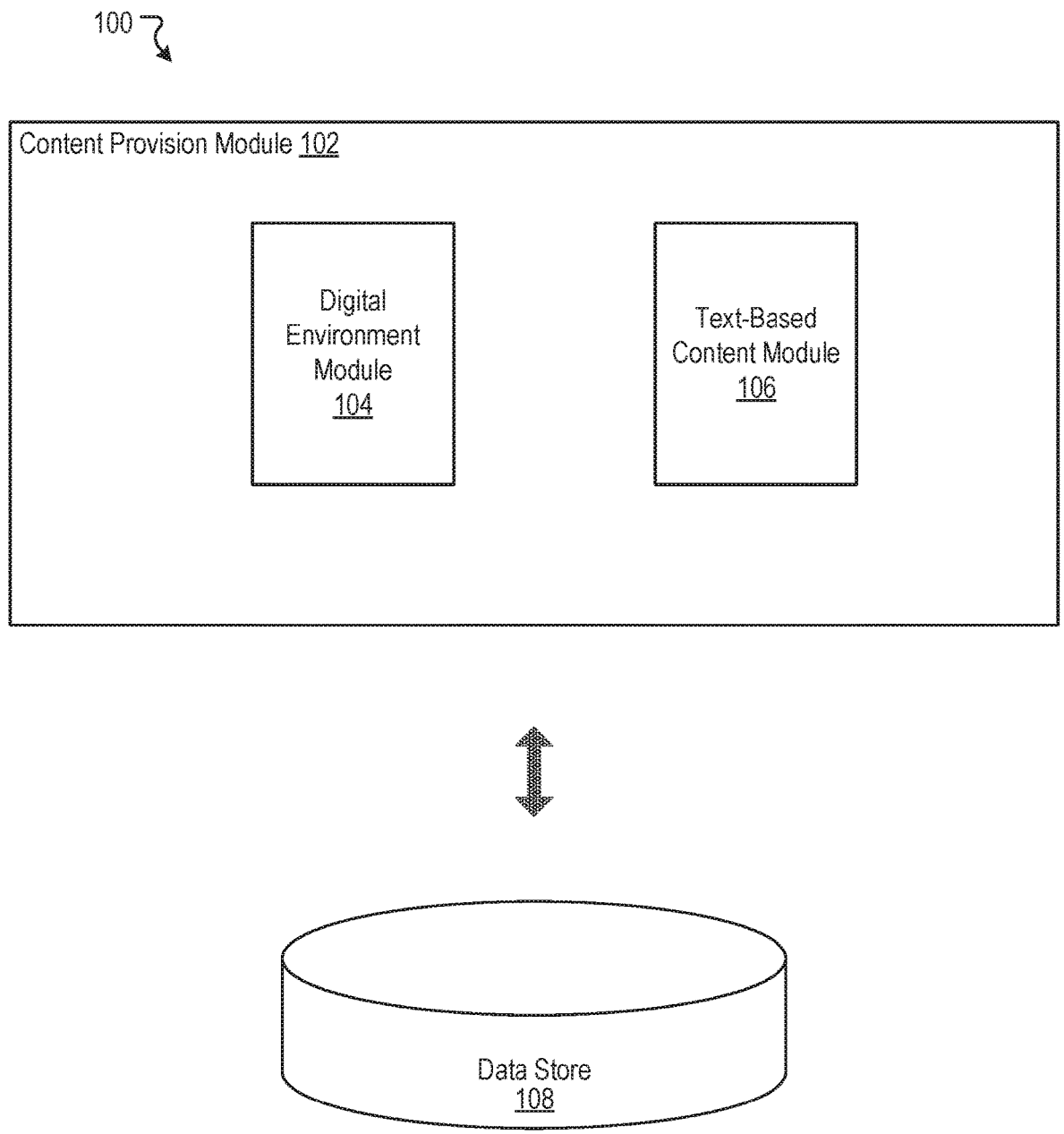
FIG. 1 illustrates a system including an example content provision module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Presentation of Text in a Virtual Reality Environment

As mentioned, users often utilize computing devices for a wide variety of purposes. Users can use their computing devices to, for example, interact with one another, access media content, share media content, and create media content. In some cases, media content can be provided by users of a social networking system. The media content can include one or a combination of, for example, text, images, videos, and audio. The media content may be published to the social networking system for consumption by others.

Under conventional approaches, media content provided through a social networking system can be accessed by users of the social networking system in various manners. In some cases, various media content can be provided to a user based on selections of the user or interests of the user as determined by the social networking system. In some instances, the social networking system can present media content for the user in support of a digital environment, such as a virtual reality (VR) environment, an augmented reality (AR) environment, or a mixed reality environment. In a digital environment, content can be provided by a user for access by other users in the digital environment. However, management of certain content items in a digital environment can pose challenges. For instance, text-based content can be provided in a digital environment to provide information to a user about the digital environment. In one example, text-based content can be used in the digital environment to provide helpful or informative annotations, explanations, or other data about elements depicted in or otherwise presented through the digital environment. However, in conventional techniques, provision of text-based content in a digital environment as well as access to the text-based content in the digital environment can be burdensome or difficult for users. As a result, the digital environment can provide a suboptimal user experience for users.

An improved approach rooted in computer technology overcomes the foregoing and other disadvantages associated with conventional approaches specifically arising in the realm of computer technology. Systems, methods, and computer readable media of the present technology can present or provide a digital environment. In some instances, the digital environment can be presented through suitable media content that can provide an immersive experience for users in the digital environment. Content, such as text-based content, can be presented within the digital environment. The text-based content can include, for example, comments, annotations, explanations, remarks, identifications, or other information about items, elements, themes, or other concepts depicted in or otherwise presented through the digital environment. A content provider can upload or otherwise provide text-based content in a digital environment for access by other users who can interact in the digital environment. A user experiencing the digital environment can access the text-based content through user interactions in the digital environment. In some instances, a user interaction directed by the user at a selected concept in the digital environment can prompt display of associated text-based content at or near the concept. Such user interaction can include, for example, a gaze or other gesture directed by the user at the selected concept. The user interaction can be detected by appropriate sensors or other equipment through which the user can interact in the digital environment. A user interaction directed at the selected concept for a duration of time less than a threshold duration of time can cause a first amount of text-based content to be displayed to the user. Continued interaction by the user directed at the selected concept can cause additional amounts of text-based content to be displayed to the user. As user interaction by the user is directed away from the selected concept, the amount of text-based content displayed can be reduced. The text-based content can be displayed at various angles to reflect changes in a perspective of the user as the user interaction is directed away from the selected concept. The text-based content can be dynamically presented in other manners. More details regarding the present technology are described herein.

FIG. 1 illustrates an example system 100 including an example content provision module 102 configured to manage text-based content in a digital environment, according to an embodiment of the present technology. The content provision module 102 can allow a content provider to provide text-based content for presentation in a digital environment. The content provision module 102 can allow a user experiencing the digital environment to access text-based content based on user interactions in the digital environment. As used herein, text-based content can include any type of content that contains or reflects some text, whether in whole or in part. While text-based content is described in various embodiments and examples herein, the present technology also can apply to other types of content, such as content that does not contain text. Further, while text-based content is associated with a selected concept in various embodiments and examples discussed herein, the present technology also can apply to presentation of text-based content that is not necessarily associated with a concept. The content provision module 102 can include a digital environment module 104 and a text-based content module 106. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the content provision module 102 can be implemented in any suitable combinations.

The digital environment module 104 can provide a digital environment for a user. As used herein, a digital environment can include, for example, a virtual reality (VR) environment, an augmented reality (AR) environment, a mixed reality (MR) environment, or the like. In some embodiments, the digital environment can be provided through media content presented through an interface accessible by a user, such as a viewport mounted within headgear or other equipment worn by the user. The media content can be any suitable type of media content supportive of provision of a digital environment for a user. The media content can include, for example, panoramic photos, 360 photos, photo spheres, 360 videos, three-dimensional (3D) simulations, 3D animations, and the like. The media content also can include, for example, a combination of different types of media content. The media content can include any content that in whole or in part reflects 360 degree views or presents 3D content or environments. In one example, the media content can include a spherical video (or 360 video) that captures a 360 degree view of a scene. Some examples of spherical videos can include videos composed using monoscopic 360 degree views, videos composed using stereoscopic 180 degree views, etc. The spherical video can be created by stitching together various video streams, or feeds, that were captured by cameras that are placed at different locations and/or positions to capture a 360 degree view of the scene. Such video streams may be predetermined for various angles (e.g., 0 degrees, 30 degrees, 60 degrees, etc.) of the spherical video. Once stitched together, a user can access the spherical video through a viewport to view a portion of the spherical video at some angle. The portion of the spherical video shown to the user can be determined based on, for example, the location and direction of the viewport in three-dimensional space. In another example, the media content can include virtual reality (VR) content through which environments can be presented to the user based on a viewport or other equipment. The environments can be simulations of actual places or depictions of fictional worlds that are presented via the equipment. A user can have the ability to move freely in the environments and to interact in them as desired. A user can interact with the environments through commands provided to the equipment or user gestures detected by the equipment. In some embodiments, a digital environment can be provided through a camera view or viewfinder of a camera or other device that can present environmental surroundings of a user for capture by the device. In some embodiments, the equipment through which the user can interact in the digital environment can be in whole or in part included in or implemented by a user device 610. Spherical or 360 videos are referenced herein for ease of illustration. However, in various embodiments, the present technology can be applied to any type of media content supportive of an immersive user experience including, for example, half sphere videos (e.g., 180 degree videos), arbitrary partial sphere videos, 225 degree videos, 3D 360 videos, to name some examples. In various embodiments, the present technology described herein can be applied to any media content that partially or wholly encompasses (or surrounds) a viewer (or user). Moreover, such media content need not be limited to, for example, videos that are formatted using a spherical shape but may also be applied to immersive media content (e.g., videos) formatted using other shapes including, for example, cubes, pyramids, and other shape representations of a video recorded three dimensional world.

The text-based content module 106 can allow a content provider to provide text-based content in a digital environment. The content provider can determine information to be included in the text-based content and a selected concept in the digital environment with which the text-based content can be associated. The text-based content module 106 can detect interactions of users in a digital environment. In particular, the text-based content module 106 can detect user interaction directed at a selected concept associated with text-based content. In response to detection of such user interaction, the text-based content module 106 can selectively present in the digital environment the associated text-based content. Functionality of the text-based content module 106 is described in more detail herein.

In some embodiments, the content provision module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provision module 102 can be, in part or in whole, implemented as software running on one or more computing devices or systems, such as on a server or a client computing device. For example, the content provision module 102 can be, in part or in whole, implemented within or configured to operate in conjunction or be integrated with a social networking system (or service), such as a social networking system 630 of FIG. 6. As another example, the content provision module 102 can be implemented as or within a dedicated application (e.g., app), a program, or an applet running on a user computing device or client computing system. In some instances, the content provision module 102 can be, in part or in whole, implemented within or configured to operate in conjunction or be integrated with client computing device, such as a user device 610 of FIG. 6. It should be understood that many variations are possible.

The system 100 can include a data store 108 configured to store and maintain various types of data, such as the data relating to support of and operation of the content provision module 102. The data store 108 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the content provision module 102 can be configured to communicate and/or operate with the data store 108.

Figure 2:
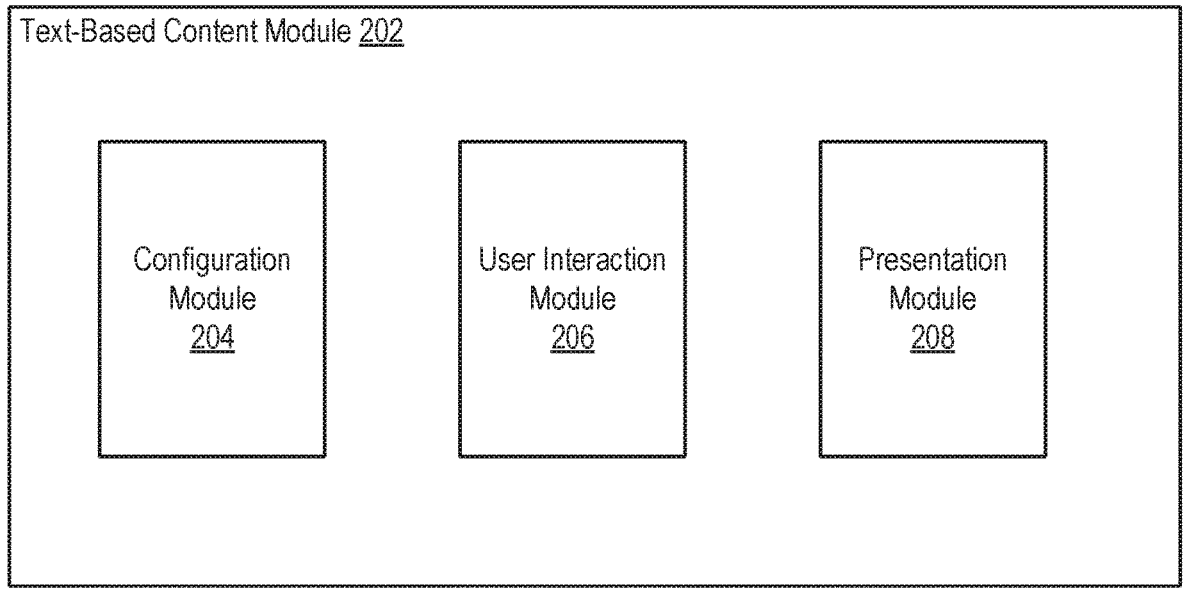
FIG. 2 illustrates an example text-based content module, according to an embodiment of the present technology.

FIG. 2 illustrates an example text-based content module 202, according to an embodiment of the present technology. In some embodiments, the text-based content module 106 of FIG. 1 can be implemented with the text-based content module 202. The text-based content module 202 can include a configuration module 204, a user interaction module 206, and a presentation module 208.

The configuration module 204 can allow a content provider to configure and create text-based content for presentation in a digital environment. The text-based content can include, for example, comments, annotations, explanations, remarks, identifications, or other information about locations, items, elements, themes, or other concepts depicted in or otherwise presented through the digital environment. A content provider can apply appropriate commands or gestures through an interface of the digital environment to create text-based content. The content provider can be prompted through the interface to provide text-based information to constitute text-based content for presentation in the digital environment. For instance, the content provider can speak or enter words through a suitable interface. In some examples, a user can enter words by, for example, typing on an actual keyboard, typing on a virtual keyboard presented in the digital environment, gesturing with body movements that are detectable by sensors or other equipment supportive of the digital environment, to name some examples. The information provided by the user can be represented as text-based content for presentation in the digital environment.

The configuration module 204 can allow the content provider to determine a selected concept in the digital environment at or near (e.g., within a threshold distance) which associated text-based content can potentially appear. The configuration module 204 can prompt the content provider to determine the selected concept associated with the text-based content. In some embodiments, the content provider can identify the selected concept by an appropriate user interaction in the digital environment. For example, the content provider can provide a description or designation of the selected concept. In one instance, the content provider can indicate the selected concept by entering an identification of the selected concept, identifying geolocational coordinates of the selected concept, or performing an appropriate interaction in the digital environment to identify the selected concept (e.g., a pointing or touching gesture). In another example, the configuration module 204 can present a listing or menu of concepts reflected in a relevant scene or view of the digital environment from which a user can select a concept. In these examples, the content provider can be provided an option to associate the text-based content to a location adjacent to the selected concept in the digital environment.

The configuration module 204 can allow the content provider to provide access rights designating users who can view the text-based content created by the content provider in the digital environment. In some embodiments, the configuration module 204 can prompt the content provider through the interface to specify the access rights. For example, the content provider can identify one or more users who are permitted access by their identifications (e.g., user IDs, names, etc.). In another example, the content provider can identify users by their degree of connection to the content provider in a social networking system. For instance, the content provider can identify users in a social networking system who are within a selected number of degrees of connection from the content provider as having permission to view the text-based content. In some embodiments, the content provider can identify users who do not have permission to view the text-based content and all other users not so identified can have permission to view the text-based content. Many variations are possible.

The user interaction module 206 can receive detected information reflecting users and their interactions in a digital environment. The detected information can be provided in real time (or near real time) by sensors or other equipment that is capable of detecting and monitoring actions of users in the digital environment. In some instances, the equipment can be attached to or worn by users. In other instances, the equipment can be directed at users to track their actions. In some embodiments, the detected information can include, for example, identities of users as well as movements and gestures of the users in a digital environment. For example, the detected information can include information regarding an interaction, such as focus or other attention, directed by a user in the digital environment at a particular location, item, element, theme, or other concept depicted in or otherwise presented through the digital environment. Such attention can include, for example, a gaze gesture by the user directed at the concept in the digital environment as detected by, for example, sensors that can detect and monitor eye movement and position of a user. Such attention also can be indicated by a step by the user in the digital environment toward the concept or a hand gesture (e.g., point, touch, hold, etc.) to select the concept, to name some examples. The detected information can reflect information specifying and distinguishing movements associated with various portions of a body associated with the user. As just one example, the detected information can include information from one or more sensors that can monitor a head or body position of a user separately or independently from an eye movement of the user. In some embodiments, the detected information also can include, for example, durations of time during which interactions, such as gaze gestures, are directed by a user at selected concepts in the digital environment. The detected information relating to the durations of time can reflect continuous monitoring of user interactions with concepts in the digital environment.

The user interaction module 206 can determine information relating to position and direction of a user and user interactions in relation to concepts in the digital environment. For example, a selected concept and its position in a digital environment can be identified. The selected concept can be associated with text-based content for potential presentation to users in the digital environment. In this example, based on detected information, a position or direction of a user interaction, such as a gaze gesture, can be determined in relation to the selected concept. In some embodiments, for the purpose of determining a position or direction of a gaze gesture by a user, the user interaction module 206 can associate the direction of the gaze gesture with, for example, a midpoint of an interface presenting the digital environment to the user, a discrete location in the digital environment at which a gaze gesture is directed as determined by eye monitoring, or some other suitable technique. The user interaction module 206 can determine a distance value between the concept, or its location in the digital environment, and a position at which a user interaction, such as a gaze gesture, is directed. If the distance value satisfies (e.g., is less than) a threshold distance value, the user interaction module 206 can determine that the user interaction of the user is directed at the concept. If, for example, a concept and a gaze gesture of a user are experiencing relative motion in the digital environment, the user interaction module 206 can make continuous or repeated determinations of the distance between the concept and the gaze gesture. When the distance value satisfies the threshold distance value, text-based content associated with the concept can be potentially presented to the user.

The presentation module 208 can selectively present text-based content to users in a digital environment. If an interaction of a user is directed at a selected concept associated with text-based content, the presentation module 208 can determine that the text-based content can be potentially displayed to the user. In some embodiments, the presentation module 208 also can perform a check of access rights to the text-based content as specified by a content provider of the text-based content. If the user is permitted to view the text-based content based on the access rights, the presentation module 208 can display the text-based content to the user. If the user does not enjoy such permission, the presentation module 208 will not display the text-based content to the user. In some instances, when a content provider does not choose to limit the potential audience for its text-based content, the text-based content can be presented to any user.

The presentation module 208 can dynamically present text-based content in a digital environment to a user through an inteface. In some embodiments, an interaction by the user can be directed at a selected concept associated with text-based content for a first duration of time. If the first duration of time is less than a threshold duration of time (e.g., three seconds, one second, etc.), the presentation module 208 can cause a selected first amount (or portion, fragment, etc.) of text-based content to be displayed to the user through the interface. For example, if the text-based content has 45 lines of text in total, the first amount can be an amount of text that is less than the 45 lines of text (e.g., first sentence of text, first four lines of text, first ten lines of text, middle section of text, most important portion of text, etc.). If the interaction by the user directed at the selected concept continues so that the duration of time of the interaction satisfies (e.g., is equal to or greater than) the threshold duration of time, the presentation module 208 in response can cause additional amounts of the text-based content to appear in the digital environment. In some embodiments, the additional amounts of text-based content can be related or in proportion to the duration of time during which the interaction has been directed at the selected concept. For example, when an eye gesture is directed at a selected concept for a relatively long duration of time, then a relatively large amount of text from the text-based content can appear. The additional amounts of the text-based content can be presented as sequentially appearing lines of text that scroll to a selected position in the interface. The position of the text-based content can move as the additional lines of text scroll to arrive at the selected position in the interface. In some embodiments, the speed of the appearance of the additional amounts of the text-based content in the interface can increase as the duration of time during which the interaction has been directed at the selected concept increases. For example, when an eye gesture is directed at a selected concept for a relatively long duration of time, then sequentially appearing lines of text from text-based content can scroll relatively quickly in the interface. Additional lines of text from the text-based content can appear through the interface for as long as the interaction by the user continues to be directed at the selected concept. Eventually, all of the text from the text-based content can appear through the interface. At this point, the text-based content can appear in a temporary state of rest in the digital environment while the interaction by the user remains directed at the selected concept.

As the interaction by the user is directed away from the selected concept, the amount of text-based content displayed to the user can be reduced. The reduction in the amount text-based content displayed to the user can be related or in proportion to a degree to which the interaction by the user is directed away from the selected concept. The degree to which the interaction by the user is directed away from the selected concept can be indicated by the detected information. In this regard, the detected information can include, for example, a relative distance or a relative velocity between a position at which the interaction by the user is directed and the selected concept. If the interaction by the user is again directed at the selected concept, the amount of text-based content displayed to the user can be increased, as described above.

The presentation module 208 can display text-based content to a user at various positions and perspectives in the digital environment. In some embodiments, the text-based content can be presented at or near (e.g., within a threshold distance from) an associated selected concept. In some embodiments, the text-based content can appear anywhere in the digital environment as determined by, for example, a content provider of the text-based content. The text-based content can be displayed to the user at various angles and perspectives to reflect changes in direction of interaction of the user in the digital environment in relation to the selected concept. For example, when interaction by the user is squarely directed at the selected concept, the text-based content can be presented to the user without skew or angle. As another example, if the interaction by the user is directed away from the selected concept, the text-based content can be presented to the user at an appropriate angle in a manner to reflect the perspective of the user in relation to the selected concept. In this example, the text-based content can be displayed through the interface at an angle reflective of the degree to which the interaction by the user is directed away from the selected concept. If the interaction by the user is again directed at the selected concept, the text-based content again can be presented to the user without skew.

Figure 3A:
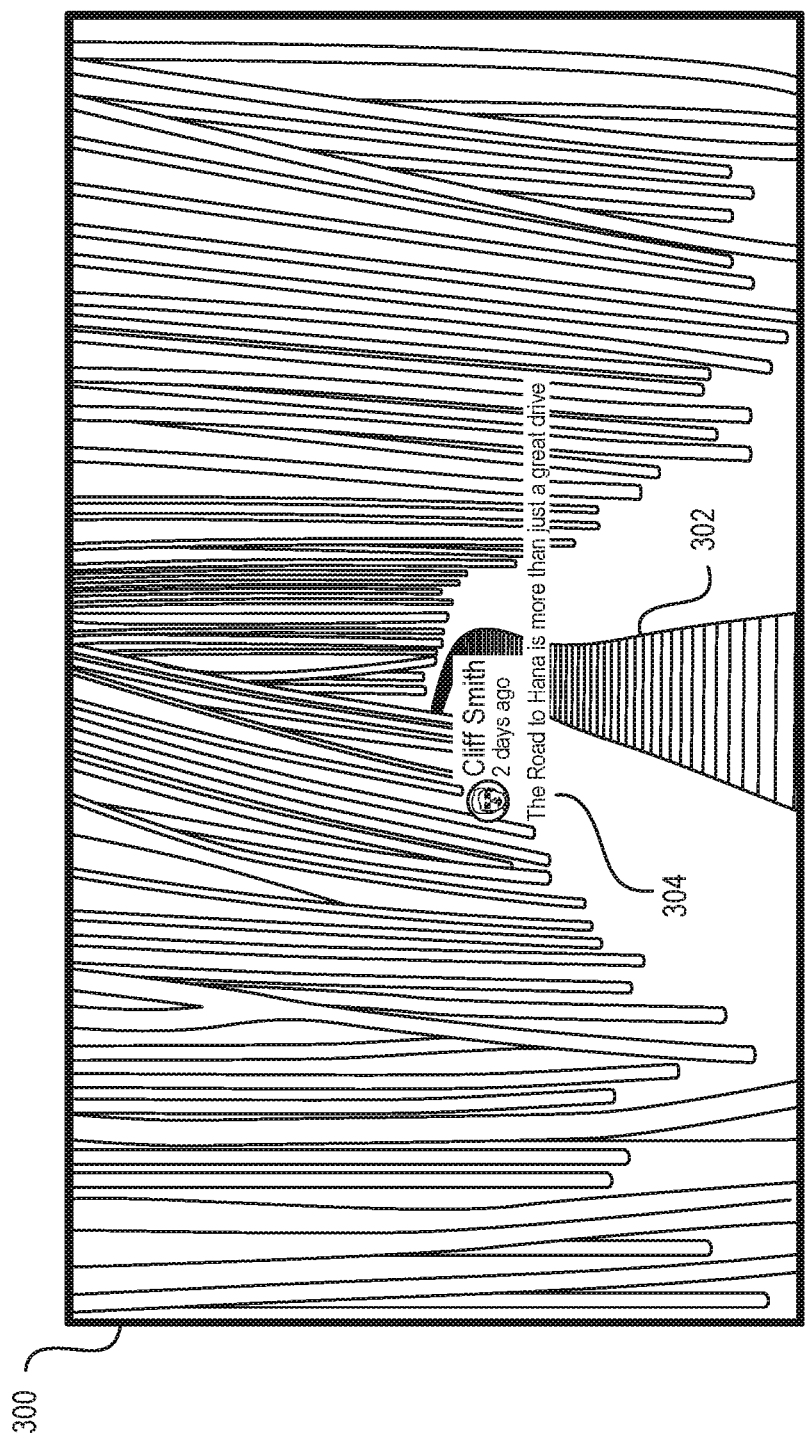
FIGS. 3A-3C illustrate example scenarios, according to an embodiment of the present technology.
Figure 3B:
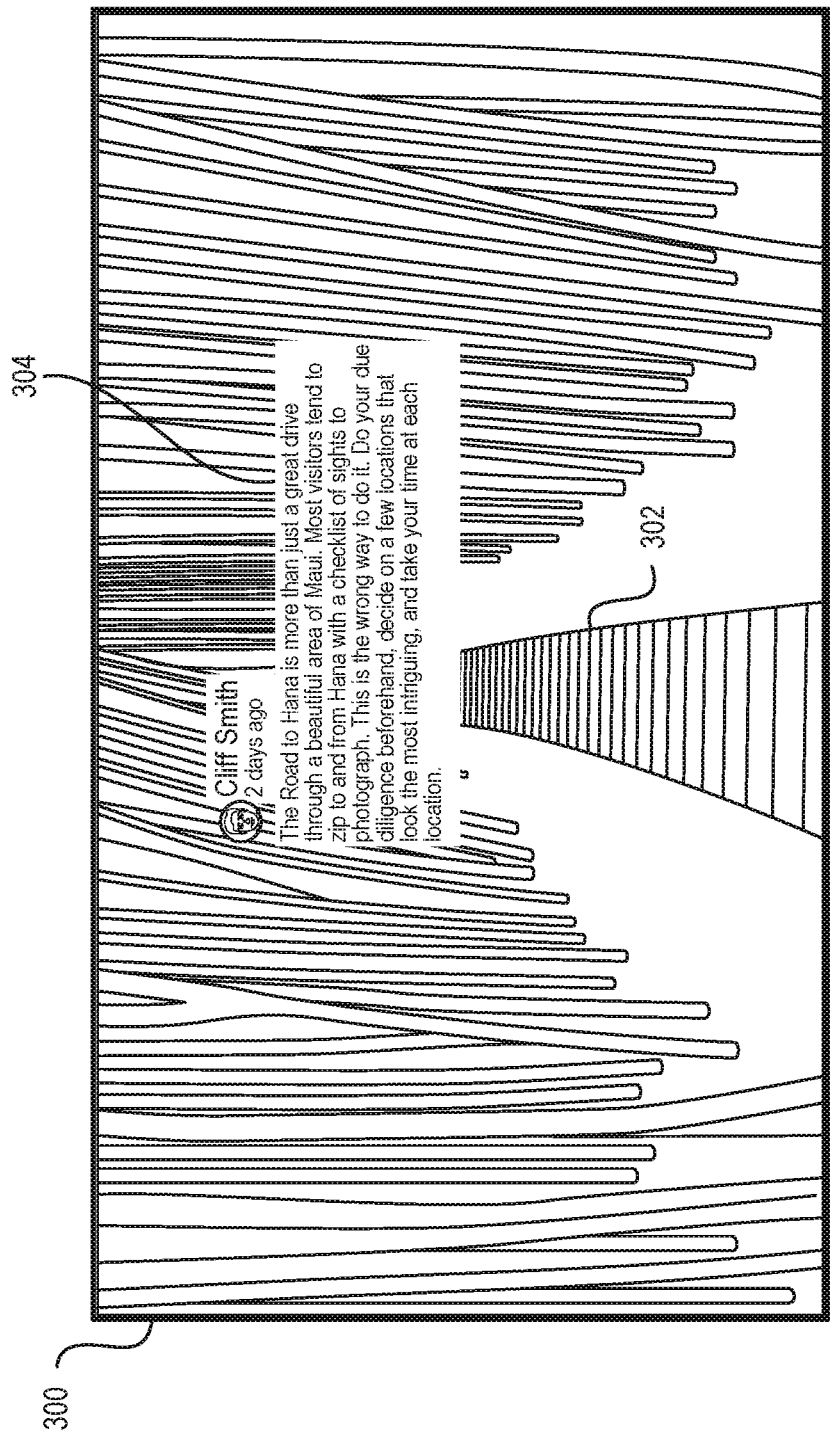
Figure 3C:
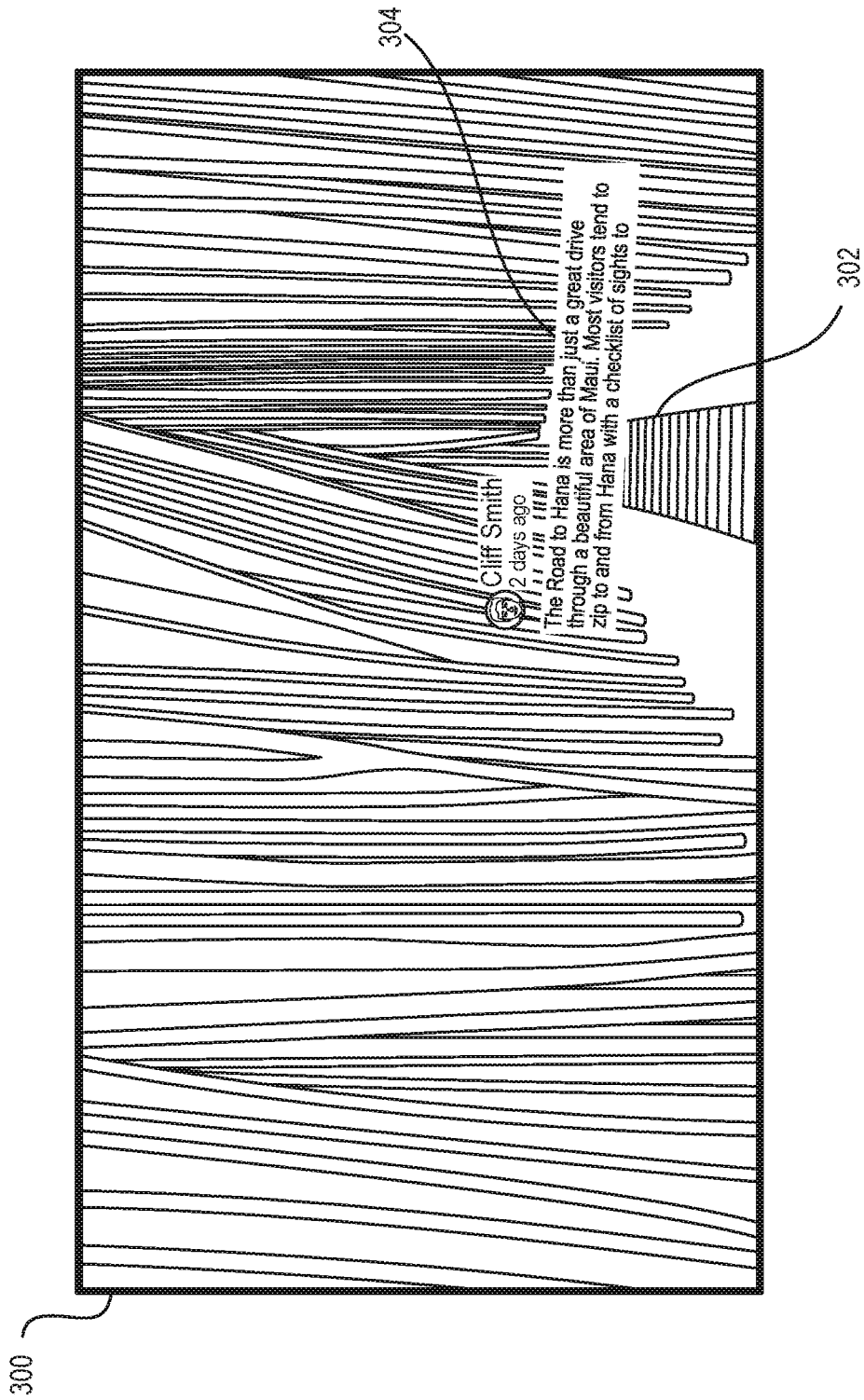

FIGS. 3A-3C illustrate various example scenarios, according to an embodiment of the present technology. As shown in FIG. 3A, an interface 300 presents a digital environment to a user. The digital environment can include, for example, a virtual reality (VR) environment, an augmented reality (AR) environment, a mixed reality (MR) environment, or the like. The digital environment can be provided through media content presented through the interface 300, such as a viewport mounted within headgear or other equipment worn by the user. The media content can be any suitable type of media content supportive of provision of a digital environment for the user. The media content can include, for example, panoramic photos, 360 photos, photo spheres, 360 videos, three-dimensional (3D) simulations, 3D animations, and the like. Although not shown, the interface 300 can also provide audio content, haptic content, and other forms of content, stimulation, or feedback to the user.

As shown, the interface 300 presents a viewport of the user reflecting a user interaction and, in particular, a gaze gesture of the user directed at a concept 302. The concept 302 in this example is a road to a destination. Detected information indicates that the gaze gesture of the user is directed at the concept 302. In response, a portion of text-based content 304 associated with the concept 302 is presented to the user. The text-based content 304 in this example includes a comment by a content provider, an identification of the content provider, and a time stamp associated with the comment. In other examples, other types of content can be presented. In some instances, access rights specified by a content provider of the text-based content 304 permit the user to view the text-based content 304. Because the user is looking directly at the concept 302, the text-based content 304 is presented to the user substantially without skew.

As shown in FIG. 3B, a duration of time during which the gaze gesture of the user has been directed at the concept 302 has been determined to satisfy a threshold duration of time. Accordingly, additional lines of text from the text-based content 304 appear through the interface 300 in the digital environment. The additional lines of text can appear through the interface 300 in a scrolling manner. The position of the text-based content 304 can move as the additional lines of text scroll to arrive at a final destination in the interface. As shown in FIG. 3C, the gaze gesture of the user is directed away from the concept 302. In this example, the direction of the gaze gesture is moving to the left of the direction of the gaze gesture in FIG. 3B. As the gaze gesture is directed away from the concept 302, the text-based content 304 can be presented through the interface in an angled or skewed manner to reflect the changed perspective of the user in relation to the concept 302. In addition, the amount of text from the text-based content 304 is reduced in response to the gaze gesture of the user being directed away from the concept 302.

FIG. 4 illustrates a first example method 400 relating to presentation of text-based content in a digital environment, according to an embodiment of the present technology. It should be appreciated that there can be additional, fewer, or alternative steps performed in similar or alternative orders, or in parallel, in accordance with the various embodiments and features discussed herein unless otherwise stated.

At block 402, the method 400 can receive detected information relating to user interaction by a user in a digital environment directed at a concept associated with text-based content. At block 404, the method 400 can cause display of at least a portion of the text-based content to the user in response to the user interaction. Other suitable techniques that incorporate various features and embodiments of the present technology are possible.

FIG. 5 illustrates a second example method 500 relating to presentation of text-based content in a digital environment, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can maintain display of at least a portion of text-based content to a user in response to detected information indicating that a first duration of time, during which a user interaction has been directed at a concept, is less than a threshold duration of time. At block 504, the method 500 can cause display to the user of a second portion of the text-based content that is more than the at least a portion of the text-based content in response to the detected information indicating that a second duration of time, during which the user interaction has been directed at the concept, is equal to or greater than the threshold duration of time. At block 506, the method 500 can cause display of a reduction in the second portion of the text-based content in response to the user interaction being directed away from the concept. Other suitable techniques that incorporate various features and embodiments of the present technology are possible.

It is contemplated that there can be many other uses, applications, features, possibilities, and variations associated with various embodiments of the present technology. For example, users can choose whether or not to opt-in to utilize the present technology. The present technology also can ensure that various privacy settings, preferences, and configurations are maintained and can prevent private information from being divulged. In another example, various embodiments of the present technology can learn, improve, and be refined over time.

Social Networking System—Example Implementation

Figure 6:
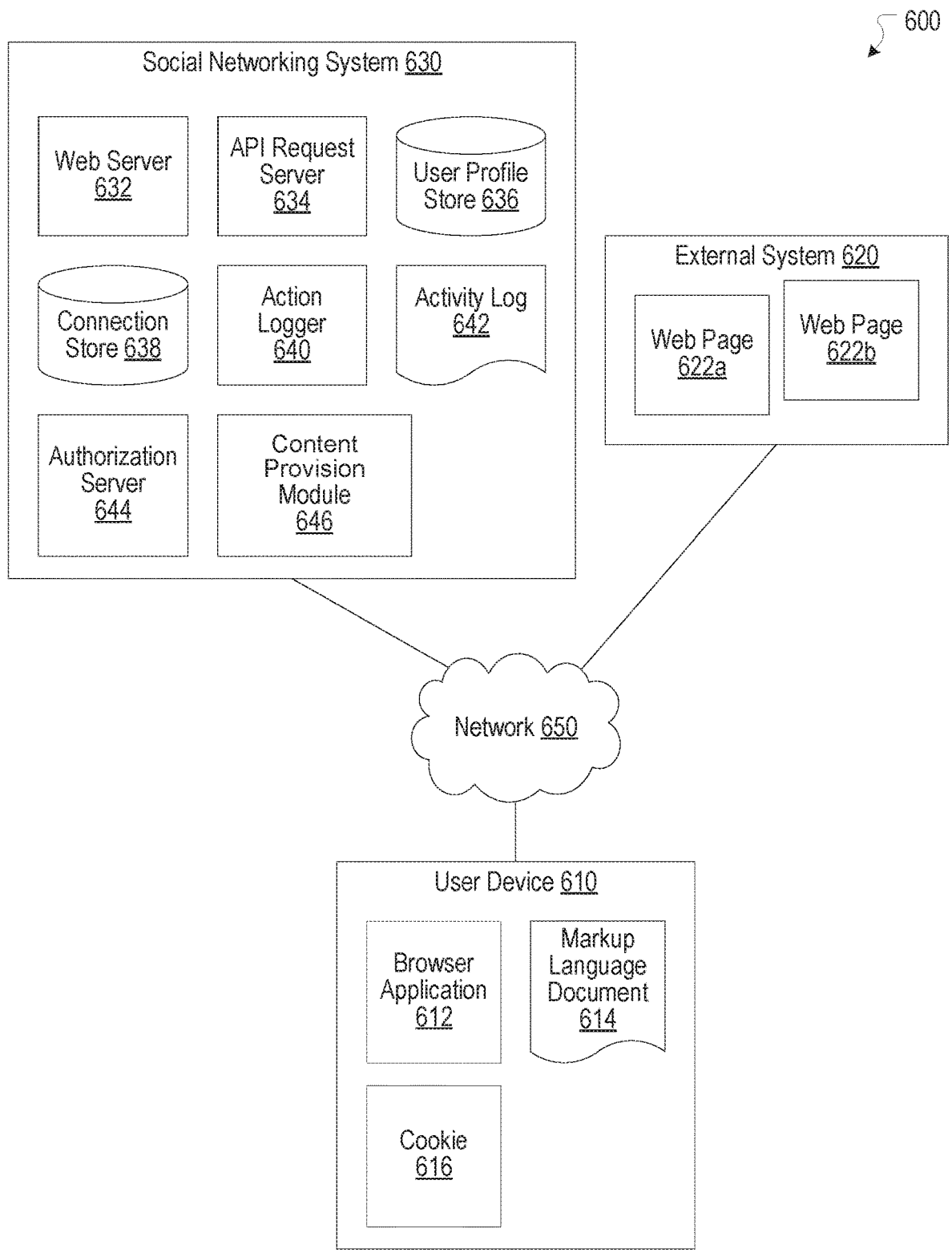
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 655. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 655. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 655. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 655, which may comprise any combination of local area and/or wide area networks, using wired and/or wireless communication systems.

In one embodiment, the network 655 uses standard communications technologies and protocols. Thus, the network 655 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 655 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 655 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 655. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 655.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 655. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 655, and the API request server 634 receives the API request. The API request server 634 processes the request by calling an API associated with the API request to generate an appropriate response, which the API request server 634 communicates to the external system 620 via the network 655. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622*a* within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provision module 646. The content provision module 646 can be implemented with the content provision module 102, as discussed in more detail herein. In some embodiments, one or more functionalities of the content provision module 646 can be implemented in the user device 610.

Hardware Implementation

Figure 7:
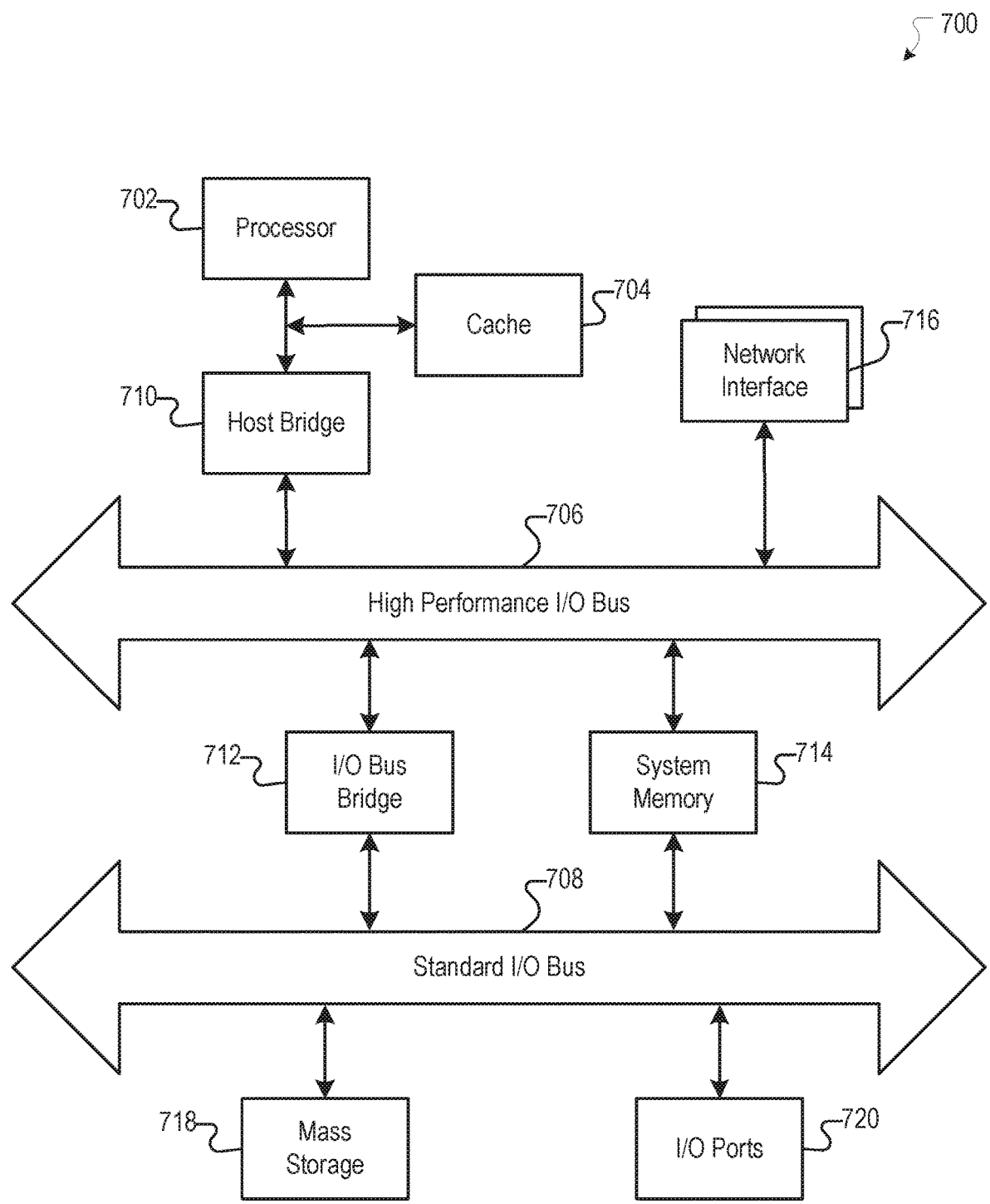
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system

700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
receiving, by a computing system, detected information relating to user interaction by a user in a digital environment directed at an item associated with text-based content for a duration of time;
causing, by the computing system, presentation through the digital environment of a first portion of the text-based content to the user when the duration of time of the user interaction does not satisfy a threshold duration of time;
when the duration of time of the user interaction satisfies the threshold duration of time, causing, by the computing system, presentation of additional lines of the text-based content without an angle in a scrolling manner until a second portion of the text-based content is presented; and
when the user interaction is directed away from the item, causing, by the computing system, presentation of a reduced amount of the text-based content at an angle, wherein the amount of the text-based content is reduced in proportion to a degree to which the user interaction is directed away from the item.

2. The computer-implemented method of claim 1, wherein the digital environment comprises at least one of a virtual reality (VR) environment, an augmented reality (AR) environment, or a mixed reality (MR) environment.

3. The computer-implemented method of claim 1, wherein the digital environment is provided through at least one of media content presented through an interface or a camera view, the media content comprising at least one of a panoramic photo, a 360 photo, a photo sphere, a 360 video, a three-dimensional (3D) simulation, or a 3D animation.

4. The computer-implemented method of claim 1, wherein the user interaction comprises a gaze gesture at the item.

5. The computer-implemented method of claim 1, wherein the text-based content is associated with access rights determined by a content provider, the user capable of viewing the text-based content based on the access rights.

6. The computer-implemented method of claim 5, wherein the access rights are based at least in part on a level of connection with the content provider.

7. The computer-implemented method of claim 1, wherein the text-based content includes at least one of a comment, annotation, explanation, remark, or identification.

8. A system comprising:
at least one processor; and
a memory storing instructions that, when executed by the at least one processor, cause the system to perform:
receiving detected information relating to user interaction by a user in a digital environment directed at an item associated with text-based content for a duration of time;
causing presentation through the digital environment of a first portion of the text-based content to the user when the duration of time of the user interaction does not satisfy a threshold duration of time;
when the duration of time of the user interaction satisfies the threshold duration of time, causing presentation of additional lines of the text-based content without an angle in a scrolling manner until a second portion of the text-based content is presented; and
when the user interaction is directed away from the item, causing presentation of a reduced amount of the text-based content at an angle, wherein the amount of the text-based content is reduced in proportion to a degree to which the user interaction is directed away from the item.

9. The system of claim 8, wherein the digital environment comprises at least one of a virtual reality (VR) environment, an augmented reality (AR) environment, or a mixed reality (MR) environment.

10. The system of claim 8, wherein the digital environment is provided through at least one of media content presented through an interface or a camera view, the media content comprising at least one of a panoramic photo, a 360 photo, a photo sphere, a 360 video, a three-dimensional (3D) simulation, or a 3D animation.

11. The system of claim 8, wherein the user interaction comprises a gaze gesture at the item.

12. The system of claim 8, wherein the text-based content is associated with access rights determined by a content provider, the user capable of viewing the text-based content based on the access rights.

13. The system of claim 12, wherein the access rights are based at least in part on a level of connection with the content provider.

14. The system of claim 8, wherein the text-based content includes at least one of a comment, annotation, explanation, remark, or identification.

15. A non-transitory computer-readable storage medium including instructions that, when executed by at least one processor of a computing system, cause the computing system to perform a method comprising:
receiving detected information relating to user interaction by a user in a digital environment directed at an item associated with text-based content for a duration of time;
causing presentation through the digital environment of a first portion of the text-based content to the user when the duration of time of the user interaction does not satisfy a threshold duration of time;
when the duration of time of the user interaction satisfies the threshold duration of time, causing presentation of additional lines of the text-based content without an angle in a scrolling manner until a second portion of the text-based content is presented; and
when the user interaction is directed away from the item, causing presentation of a reduced amount of the text-based content at an angle, wherein the amount of the text-based content is reduced in proportion to a degree to which the user interaction is directed away from the item.

16. The non-transitory computer-readable storage medium of claim 15, wherein the digital environment comprises at least one of a virtual reality (VR) environment, an augmented reality (AR) environment, or a mixed reality (MR) environment.

17. The non-transitory computer-readable storage medium of claim 15, wherein the digital environment is provided through at least one of media content presented through an interface or a camera view, the media content comprising at least one of a panoramic photo, a 360 photo, a photo sphere, a 360 video, a three-dimensional (3D) simulation, or a 3D animation.

18. The non-transitory computer-readable storage medium of claim 15, wherein the user interaction comprises a gaze gesture at the item.

19. The non-transitory computer-readable storage medium of claim 15, wherein the text-based content is associated with access rights determined by a content provider, the user capable of viewing the text-based content based on the access rights.

20. The non-transitory computer-readable storage medium of claim 15, wherein the text-based content includes at least one of a comment, annotation, explanation, remark, or identification.

* * * * *